(12) United States Patent
Ward (10) Patent No.: US 11,479,049 B2
(45) Date of Patent: Oct. 25, 2022

(54) LOAD CELLS FOR PRINT SUPPLIES

(71) Applicant: HEWLETT-PACKARD DEVELOPMENT COMPANY, L.P., Spring, TX (US)

(72) Inventor: Jefferson P. Ward, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 33 days.

(21) Appl. No.: 16/605,792

(22) PCT Filed: Aug. 1, 2018

(86) PCT No.: PCT/US2018/044839
§ 371 (c)(1),
(2) Date: Oct. 16, 2019

(87) PCT Pub. No.: WO2020/027831
PCT Pub. Date: Feb. 6, 2020

(65) Prior Publication Data
US 2021/0354473 A1 Nov. 18, 2021

(51) Int. Cl.
*B41J 2/175* (2006.01)

(52) U.S. Cl.
CPC ....... *B41J 2/17566* (2013.01); *B41J 2/17523* (2013.01); *B41J 2/17526* (2013.01); *B41J 2/17546* (2013.01)

(58) Field of Classification Search
CPC ................ B41J 2/17566; B41J 2/17523; B41J 2/17526; B41J 2/17546; B41J 2/17503; B41J 2/17553
See application file for complete search history.

(56) References Cited

U.S. PATENT DOCUMENTS

| | | | |
|---|---|---|---|
| 5,731,824 A | 3/1998 | Kneezel et al. | |
| 6,026,683 A | 2/2000 | Lee | |
| 6,435,638 B1 | 8/2002 | Wilson et al. | |
| 6,648,434 B2 | 11/2003 | Walker et al. | |
| 6,929,343 B2 * | 8/2005 | Farr | B41J 2/17566 347/19 |
| 7,458,656 B2 | 12/2008 | Smith | |
| 8,472,819 B2 | 6/2013 | Chaplin et al. | |
| 2009/0322808 A1 | 12/2009 | Mitchell et al. | |
| 2015/0247753 A1 | 9/2015 | Braissant et al. | |

FOREIGN PATENT DOCUMENTS

| | | |
|---|---|---|
| EP | 1004447 A2 | 5/2000 |
| EP | 1745932 A1 | 1/2007 |
| EP | 2298539 A1 | 3/2011 |
| JP | H1172371 A | 3/1999 |
| JP | 2007112033 A | 5/2007 |

* cited by examiner

*Primary Examiner* — Bradley W Thies
(74) *Attorney, Agent, or Firm* — Fabian VanCott (57) ABSTRACT

A print supply, the print supply containing a print material and to connect to a printing device to provide the print material to the printing device that includes a container to maintain the print material, an integrated circuit coupled to the box to interface electrically with the printing device, and a load cell communicatively coupled to the integrated circuit to detect a weight of the print liquid supply.

24 Claims, 8 Drawing Sheets

LOAD CELLS FOR PRINT SUPPLIES

BACKGROUND

Printing devices operate to dispense a print material onto a substrate surface. For example, a printing device may operate to dispense a fluid, such as ink, onto a surface, such as paper, in a predetermined pattern. In other examples, an additive manufacturing material is dispensed as part of an additive manufacturing operation to print a 3D object. The print material in either example is supplied to such printing devices from a reservoir or other print material supply. That is, a supply holds a volume of print material that is passed to the printing device and ultimately deposited on a surface.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing devices may receive a supply of print material from a number of sources. In an example, the printing device may include an internal reservoir that is itself supplied by a supply coupled to a supply port. The supply may be any type of device that can maintain a volume of print material and be physically and selectively removed from the printing device. The weight of the print material maintained within the supply may change over use of the supply. Indeed, as multiple interactions of coupling the supply to the printing device, transferring print material to the printing device, and removing the supply from the printing device the weight of the print material is reduced in a stepwise manner.

Being able to discern the weight of print material in the supply may increase the usability of both the printing device and the supply. By way of example, when the supply is used, the supply may be temporarily coupled to the printing device allowing the print material to be transferred therefrom. However, the devices within the printing device such as pumps may be damaged if the print material within the supply has been exhausted completely. Indeed, damage could occur to, specifically, the pump when the pump is activated without pumping a print material. In order to prevent this damage, the quantity of print fluid within the supply may be determined prior to pumping the print material from the supply.

The present specification describes a print supply, the print supply containing a print material and to connect to a printing device to provide the print material to the printing device that includes a container to maintain the print material, an integrated circuit coupled to the box to interface electrically with the printing device, and a load cell communicatively coupled to the integrated circuit to detect a weight of the print liquid supply.

The present specification further describes a method of determining a volume of print material within a supply that includes detecting the supply at a port of a printing device, with a processor, reading a volumetric value of print material within the supply saved on an integrated circuit coupled to the supply, conducting a print material transfer process comprising drawing print material from the supply to an internal reservoir in the printing device, measuring a level of print material within the internal reservoir during the transfer process, reporting a detected change in a load cell value at an interface between the port and printing device, and validating a reported print material transfer to the internal reservoir.

The present specification also describes a printing device, that includes a print material port, a load cell coupled to the print material port to detect a weight of a supply, an internal reservoir, and a processor to detect an amount of print material transferred to the internal reservoir and compare it to the detected weight of the supply.

As used in present specification and in the appended claims the term "load cell" is meant to be understood as any device that determines the weight of an object. Some examples include a strain gauge, a spring with a varistor, and a piezo electric device, among others.

Figure 1:
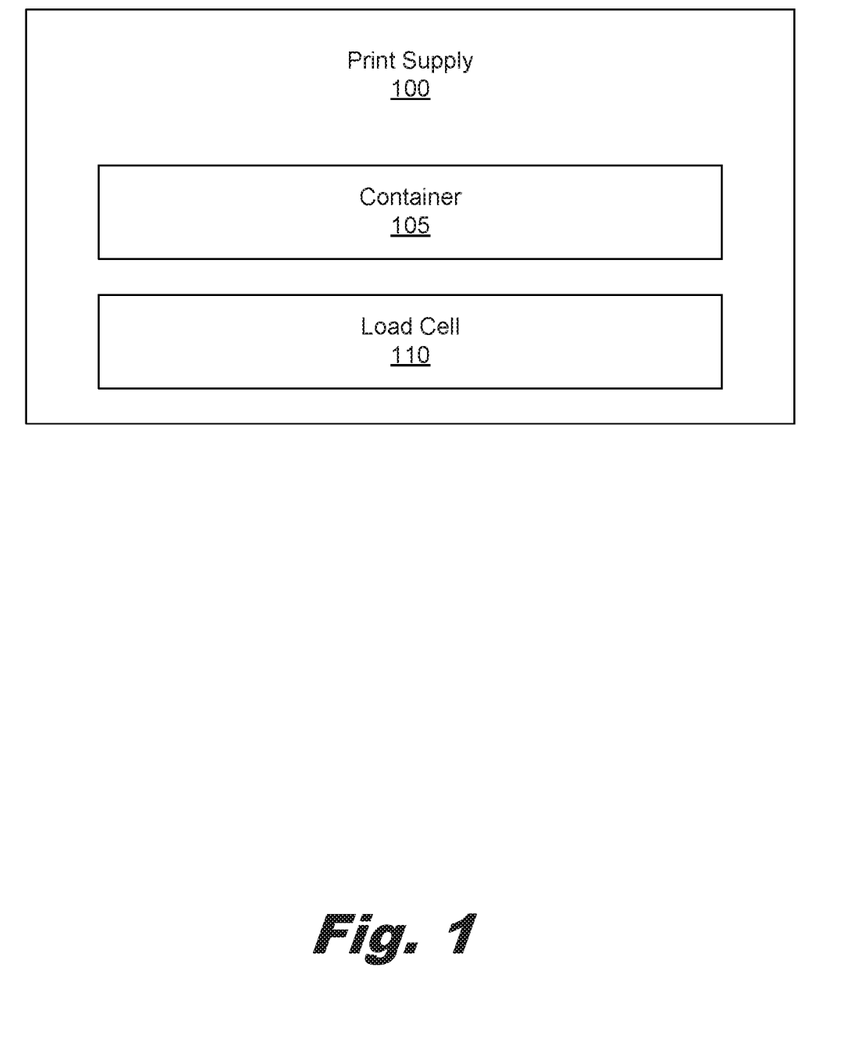
FIG. 1 is a block diagram of a print supply according to an example of the principles described herein.

Turning now to the figures, FIG. 1 is a block diagram of a print supply (100) according to an example of the principles described herein. The print supply (100) may include a container (105) and a load cell (110). In any example, presented herein, the print supply may maintain any type and amount of print material for transfer to a printing device. The present specification, therefore, contemplates the use of any type of print material including any type of fluidic print material and solid print material. Although, the present specification describes, in examples, the use of a fluidic print material, the present specification contemplates the use of any type of print material that may be transferred to a printing device.

The container (105) may be any type of container that may maintain the print material therein. In an example, the container (105) may include a reservoir into which a print material may be maintained. A number of print material channels may be formed within the container (105) to selectively allow the print material to be pumped out of the container (105). In a specific example, the container (105) may include a bag and a box. In this example, the bag may be filled with the print material and placed in the box. The box provides for a physical support structure and may be relatively more robust than the bag alone. This bag-in-box example may provide a user with the ability to store the print supplies (100) when not coupled to the printing device.

The print supply (100) may include, in an example, an integrated circuit. The integrated circuit may be electrically and communicatively coupled to the printing device as the print supply (100) is mechanically coupled to the printing device. In an example, the integrated circuit may be communicatively coupled to a memory device. In this example, the integrated circuit and the memory device may be inclusively electrically and communicatively coupled to the printing device as the print supply (100) is mechanically coupled to the printing device. Example memory devices may include any non-volatile memory device such as EEPROM, ROM, fuses, CD-ROM, magnetic tape, bubble memory, flash memory, battery backed RAM, or battery backed SRAM, among others. The memory device may maintain any data that is used by the printing device to authenticate the container (105) and/or print material in the container (105) as well as maintain other data associated with the use of the container (105) according to the method described herein. The memory device may, in an example, store data to be used by a processor in the printing device to convert output signals from the load cell into an estimate of the volume of consumable material remaining in the supply In an example, the integrated circuit may interface with the printing device using a number of electrical pads. The electrical pads may interface with a number of electrical leads on the printing device. As such, the integrated circuit may receive electrical signals from the printing device, receive power from the printing device, and may further provide data to the printing device according to the methods described herein. The data provided to the printing device by the integrated circuit may include authentication data. The authentication data may be used and interpreted by a processing device of the printing device in order to determine that that the container (105) and the print material maintained therein may be used with the printing device. The authentication data may be secured using any type of authentication method so that the data may not be tampered with. The data provided by the integrated circuit and/or memory device to the printing device may also include data associated with characteristics of the print material. These characteristics may include viscosity, density, color, chemical composition, manufacturing date, date of filling of the container (105) with the print material, and expiration date of the print material, among other characteristics. The data provided by the integrated circuit and/or memory device may also include volume data. The volume data may describe the amount of print material remaining in the container (105) of the print supply (100). The data provided by the integrated circuit and/or memory device may also include data which can be used by a processor of the printing device to estimate the volume of print material present in the print supply (100) when the print supply (100) is initially coupled to the printing device or whenever the print supply (100) is subsequently coupled to the printing device.

During use, the memory device, via the integrated circuit, may be regularly updated with an amount of print material removed from the container (105) of the print supply (100) in order to maintain a record of how much print material remains. This information may be passed along to the printing device in every instance the print supply (100) is coupled to the printing device.

In any example presented herein, the print supply (100) may include a load cell (110). The load cell (110) may be communicatively coupled to the integrated circuit on the print supply (100) and/or a processor of the printing device. As the print supply (100) is mechanically coupled to the printing device, the load cell may determine the weight of the print supply (100). Additionally, in an example, the load cell (110) may measure the weight of the print supply (100) as print material is transferred or pumped from the container (105) to an internal reservoir of the printing device. According to some example methods presented herein, the integrated circuit may send the weight data obtained by the load cell (110) to the printing device in order to validate the amount of print material transferred to the printing device.

In an example, the validation of the amount of print material transferred from the print supply (100) to the internal reservoir of the printing device may be accomplished by comparing the detected weight of the print supply (100) (minus the weight of the container (105) and other physical elements) to a print supply level gauge reading of the printing device. In an example a look-up table maintained on a data storage device associated with the integrated circuit, printing device, and/or print supply (100) may be used to determine if the data obtained by the load cell (110) matches the data obtained by the print material level gauge on the internal reservoir of the printing device. The look-up table may allow the weight of the print material transferred (weight of print supply (100) before and then after transfer of print material) to be referenced as a volume of print material.

By comparing the volume of print material to the change in volume within the internal reservoir of the printing device, the printing device can determine certain characteristics about the print supply (100) itself. For example, where the data from the load cell is significantly less than the original volume of fluid in the print supply (100) (per the data on the integrated circuit minus the data describing the level of print material transferred to the internal reservoir (measured by the print material gauge), the printing device may determine that the print supply (100) is leaking and provide a warning, via a user interface, to a user of the leakage. In any example presented herein, the term "significantly" is meant to be understood as a degree that is one standard deviation away from an expected value.

In another example, where the data from the load cell is significantly greater than the original volume of fluid in the print supply (100) (per the data on the integrated circuit minus the data describing the level of print material transferred to the internal reservoir (measured by the print material gauge), the printing device may determine that the print supply (100) is defective and, via a user interface, present a warning to a user of the defective nature of the print supply (100). In this example, the printing device may prevent any printing process to be stopped until an authorization key is entered or the defective print supply (100) has been addressed.

In another example where the data from the load cell is equal to the original volume of fluid in the print supply (100) (per the data on the integrated circuit minus the data describing the level of print material transferred to the internal reservoir (measured by the print material gauge), the printing device may continue with updating the integrated circuit with the new print material volumes within the container (105). These comparisons may be made at any time and/or multiple times before, during and after print material transfer from the print supply (100) to the printing device. In this manner, a printing device may iteratively update the data on the memory device regarding how much print material remains in the container (105). Consequently, the printing device may know when to stop pumping print material from the print supply (100) as the amount of print material is depleted. This may prevent damage to any of the components of the printing device when print material is not being pumped.

Figure 2:
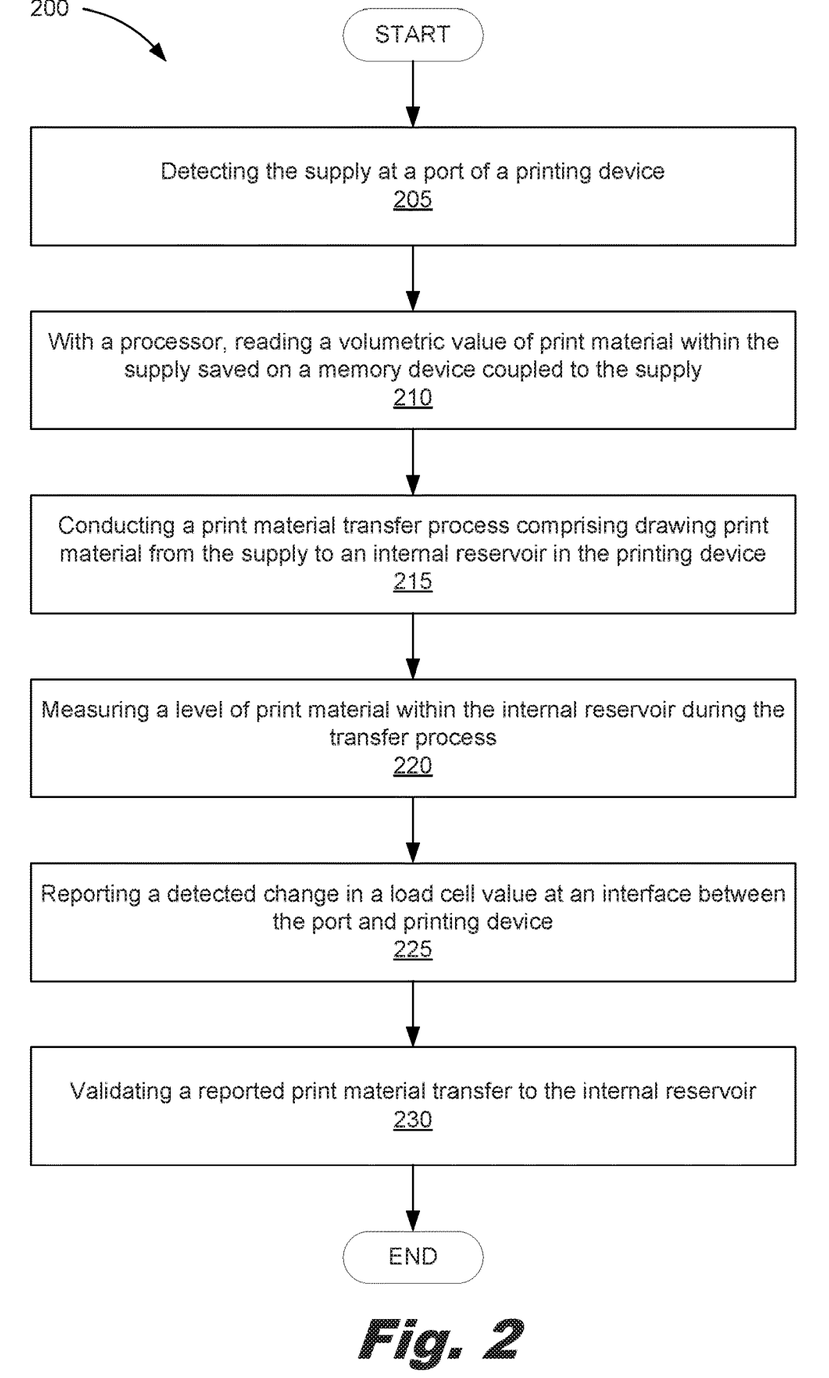
FIG. 2 is a flowchart showing a method of determining a volume of print material within a supply according to an example of the principles described herein.

FIG. 2 is a flowchart showing a method (200) of determining a volume of print material within a supply according to an example of the principles described herein. The method may include detecting (205) a supply at a port of a printing device. As described herein the print supply (FIG. 1, 100) may include an integrated circuit. The integrated circuit may include a number of electrical contact pads that, when the print supply (FIG. 1, 100) is mechanically coupled to the printing device allows the integrated circuit and, accordingly, the print supply (FIG. 1, 100) to be detected. The detection may occur as power is supplied to the integrated circuit.

The method (200) may continue with, with a processor, reading (210) a volumetric value of print material within the supply saved on the integrated circuit coupled to the supply. In an example, the processor may be the processor of the printing device that, as power is applied to the integrated circuit, reads data on a data storage device associated with the integrated circuit. In this example, the integrated circuit may maintain the volumetric value provided to it either during an original manufacturing process or during a previous coupling of the print supply (FIG. 1, 100) to a printing device. Because this volumetric value is constantly updated, the value may be changed during the lifetime of the print supply (FIG. 1, 100).

The method (200) may continue with conducting (215) a print material transfer process including drawing fluid from the supply to an internal reservoir in the printing device. As described herein, the printing device may include any number of print material transfer devices such as pumps and print material channels in order to complete the transfer process. Any amount of the print material within the print supply (FIG. 1, 100) may be transferred to the printing device including the entirety or remaining portion of print material within the print supply (FIG. 1, 100).

The method (200) may include measuring (220) a level of print material within the internal reservoir during the transfer process. In an example, the printing device may include a print material level gauge that, as the internal reservoir is filled with any amount of print material, detects a change in volume of the print material. In an example, the print material level gauge may be a continuous level gauge so as to detect the rise in level of the print material at any location along a vertical wall of the internal reservoir. Sensors such as capacitive or inductive sensors may be used as the continuous level gauge. In an example, the print material level gauge may be a discrete print material level sensor that measures the level of print material within the internal reservoir at discrete locations along the height of the internal reservoir.

The method (200) may continue with reporting (225) a detected change in a load cell value at an interface between the port and printing device. As described herein, the load cell (FIG. 1, 110) may measure the weight of the print supply (FIG. 1, 100) before, during, and after the print material transfer process is conducted (215). In an example, the load cell (FIG. 1, 110) is coupled to the print supply (FIG. 1, 100) and is communicatively coupled to the integrated circuit. In this example, the detected change in the load cell (FIG. 1, 110) value is reported (225) to the integrated circuit which, in turn, reports (225) that information to the processor of the printing device. In an example, the load cell (FIG. 1, 110) is coupled to the printing device such that as the print supply (FIG. 1, 100) is mechanically coupled to the printing device and detected (205) by the printing device, the load cell (FIG. 1, 110) may measure the weight of the print supply (FIG. 1, 100). In this example, changes in the weight of the print supply (FIG. 1, 100) as detected by the load cell (FIG. 1, 110) may be directly reported (225) to the processor of the printing device.

The method (200) may include validating (230) a reported print material transfer to the internal reservoir. As described herein, the validation (230) includes comparing a weight detected by the load cell (FIG. 1, 110) with the volume of print material received at the internal reservoir of the printing device. In an example, a look-up table is used to convert the value representing a change in weight of the print supply (FIG. 1, 100) to a volumetric value representing a volume of the print material transferred. The look-up table may include weight-to-volume conversion equations as well as coefficients derived specifically for the type of print material being weighed.

The validation (230) process may be used to determine the health of the print supply (FIG. 1, 100) as well as whether the processor of the printing device should update the data representing the volume of print material maintained or remaining in the print supply (FIG. 1, 100). As described herein, validating (230) the reported print material transfer includes subtracting the volumetric value of print material within the supply saved on an integrated circuit from a change in volume of print material within the internal reservoir to get a volume comparison value. When the load cell value is less than the volume comparison value, the processor may cause a warning to be presented indicating a leak in the supply. When the load cell value is greater than the volume comparison value or greater than either the current estimated weight of the supply contained in the printing device or the last recorded weight of the print supply recorded in the memory affixed device to the print supply and electrically coupled to the print device, the processor may cause a warning to be presented indicating the supply is defective. When the load cell value is equal to the volume comparison value, the processor may update the volumetric value of print material within the supply saved on the integrated circuit. In this manner, the printing device may read a print material level value from the integrated circuit and write, to a data storage device of the integrated circuit, updated print material level data representing a current level of print material in the print supply (FIG. 1, 100). By doing so, the printing device may know when, if ever, to conduct (215) a print material transfer process thereby preventing damage to the printing device's components should no or little print material remains in the print supply (FIG. 1, 100).

Figure 3:
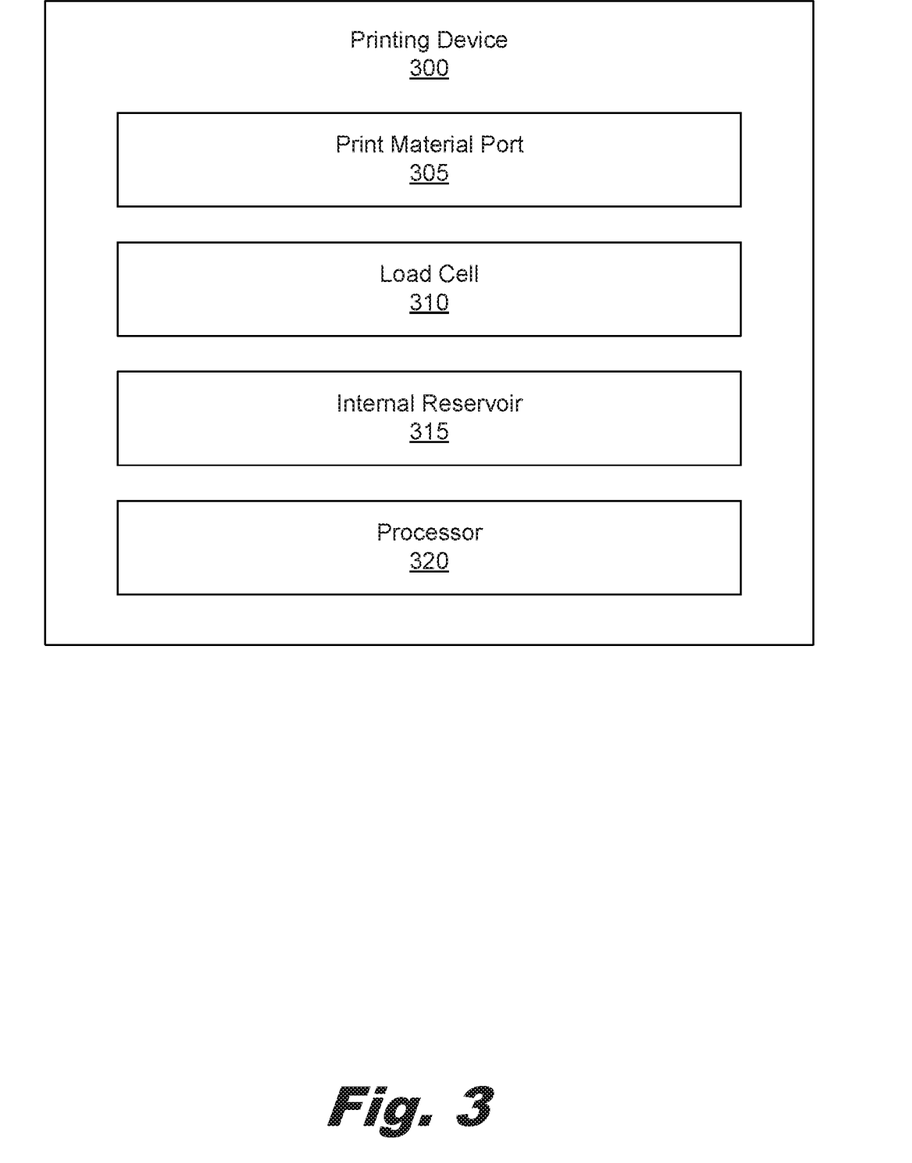
FIG. 3 is a block diagram of a printing device according to an example of the principles described herein.

FIG. 3 is a block diagram of a printing device (300) according to an example of the principles described herein. In this example, the printing device (300) may include a print material port (305), a load cell (310), an internal reservoir (315), and a processor (320). As described herein, the processor (320) may detect the presence of a print supply (FIG. 1, 100) at the print material port (305). When this occurs, the processor (320) may access data from an integrated circuit of the print supply (FIG. 1, 100) in order to determine the most recently stored print material volume data associated with that print supply (FIG. 1, 100). The processor (320) may then engage in a print material transfer process as described herein in order to transfer an amount of print material from the print supply (FIG. 1, 100) and into the internal reservoir (315) of the printing device (300). In an example, the load cell (310) may, in real-time, transfer data regarding the changing weight of the print supply (FIG.

1, 100) during the transfer of the print material. When the transfer is completed, the final value from the load cell (310) is received by the processor (320). The processor (320) then may access a look-up table and calculate a volume of print material transferred into the internal reservoir (315) based on the final weight of the print supply (FIG. 1, 100) detected by the load cell (310). As described herein, this value is compared to a measured value of print material received at the internal reservoir (315). Based on the comparison, any number of warnings may be presented indicating a defective print supply (FIG. 1, 100) or the integrated circuit of the print supply (FIG. 1, 100) may be updated with the new value describing the volume of print material remaining in the print supply (FIG. 1, 100).

Figure 4:
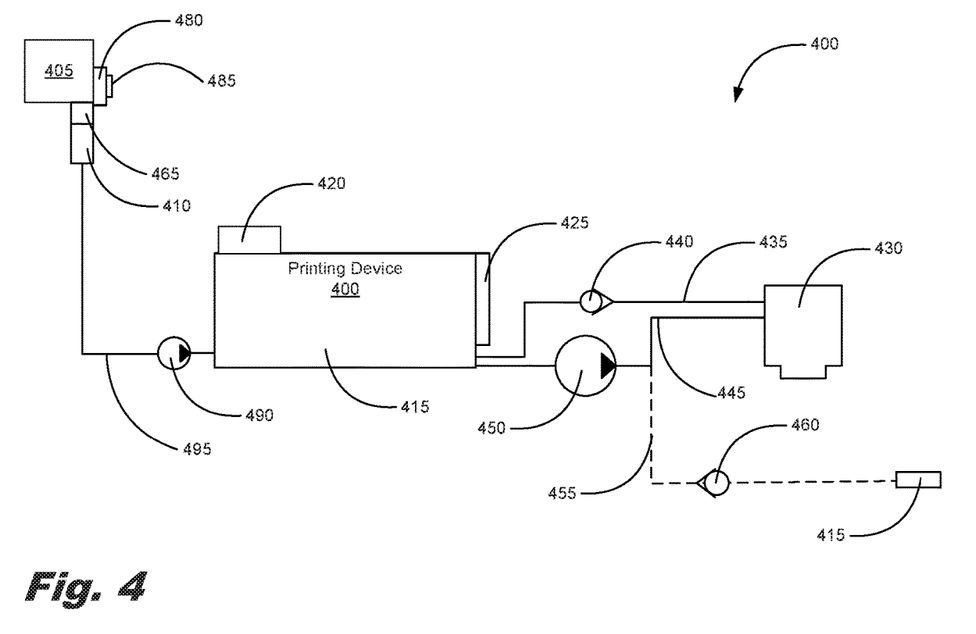
FIG. 4 is a schematic drawing of a printing device according to an example of the principles described herein.

FIG. 4 is a schematic drawing of a printing device (400) according to an example of the principles described herein. In any of the examples presented herein, the printing device (400) shown and described in FIG. 4 may include similar components as those described in connection with FIGS. 1 and/or 3. In any of the examples presented herein, the printing device (400) may interface with a supply (405) at an input port (410) of the printing device (400). The supply (405) may include an integrated circuit (480) having a memory device (485).

The printing device (400) may also include an internal reservoir (415) to receive an amount of print material from the supply (405). The internal reservoir (415) may have a print material level gauge (425) coupled thereto to detect an absolute and changing volume of print material maintained in and transferred into the internal reservoir (415). In an example, the print material level gauge (425) may be a continuous print material level gauge (425) so as to measure the level at any increment along a vertical wall of the internal reservoir (415).

The printing device (400) may include any number of elements that provide the printing device (400) with the ability to selectively deposit print material onto a print media such as a sheet of paper. These other devices may include a printhead (430) that is fluidically coupled to the internal reservoir (415) via a supply line having a pump (450) to pump print material to the print head (430). A return line (435) with a return valve (440) may be coupled to the printhead (430) and internal reservoir (415) so as to provide a one-way directional flow of print material back to the internal reservoir (415). The printing device (400) may also include a drain line (455), drain port (415), and drain valve (460) to provide a way to evacuate print material from the internal reservoir (415) of the printing device (400).

Between the input port (410) and the internal reservoir (415), the printing device (400) may also include a supply pump (490) that draws print material from the supply (405), through a supply line (495) and into the internal reservoir (315). As described herein, damage may occur to the supply pump (490) if print material is not present in the supply (405) and the supply pump (490) is activated. In order to prevent this, a processor (420) accesses the memory device (485) of the integrated circuit (480) to determine a previously entered print material level value describing the level of print material within the supply (405). A load cell (465) may detect the weight of the supply (405) at any time and provide that weight value to the processor (420) for validating (FIG. 2, 230) the amount of print material contained within the supply (405) transferred from the supply (405) to the internal reservoir (415) as described.

The printing device (300, 400) may be utilized in any data processing scenario including, stand-alone hardware, mobile applications, through a computing network, or combinations thereof. Further, the printing device (300, 400) may be used in a computing network, a public cloud network, a private cloud network, a hybrid cloud network, other forms of networks, or combinations thereof. In one example, the methods provided by the printing device (300, 400) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the printing device (300, 400) are executed by a local administrator.

To achieve its desired functionality, the printing device (300, 400) may include various hardware components. Among these hardware components may be a number of processors (420), a number of data storage devices, a number of peripheral device adapters, and a number of network adapters. These hardware components may be interconnected through the use of a number of buses and/or network connections. In one example, the processor (420), data storage device, peripheral device adapters, and network adapter may be communicatively coupled via a bus.

The processor (420) may include the hardware architecture to retrieve executable code from the data storage device and execute the executable code. The executable code may, when executed by the processor (420), cause the processor (420) to implement at least the functionality of detecting the supply at a port of a printing device, reading a volumetric value and/or weight of print material within the supply saved on an integrated circuit coupled to the supply, conducting a print material transfer process comprising drawing print material from the supply to an internal reservoir in the printing device, measuring a level of print material within the internal reservoir during the transfer process, reporting a detected change in a load cell value at an interface between the port and printing device, and validating a reported print material transfer to the internal reservoir according to the methods of the present specification described herein. In the course of executing code, the processor (420) may receive input from and provide output to a number of the remaining hardware units.

The data storage device may store data such as executable program code that is executed by the processor or other processing device. The data storage device may specifically store computer code representing a number of applications that the processor (420) executes to implement at least the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage purposes. For example, in certain examples the processor (420) may boot from Read Only Memory (ROM), maintain nonvolatile storage in the Hard Disk Drive (HDD) memory, and execute program code stored in Random Access Memory (RAM).

The hardware adapters in the printing device (300, 400) enable the processor (420) to interface with various other hardware elements, external and internal to the printing device (300, 400). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

Figure 5:
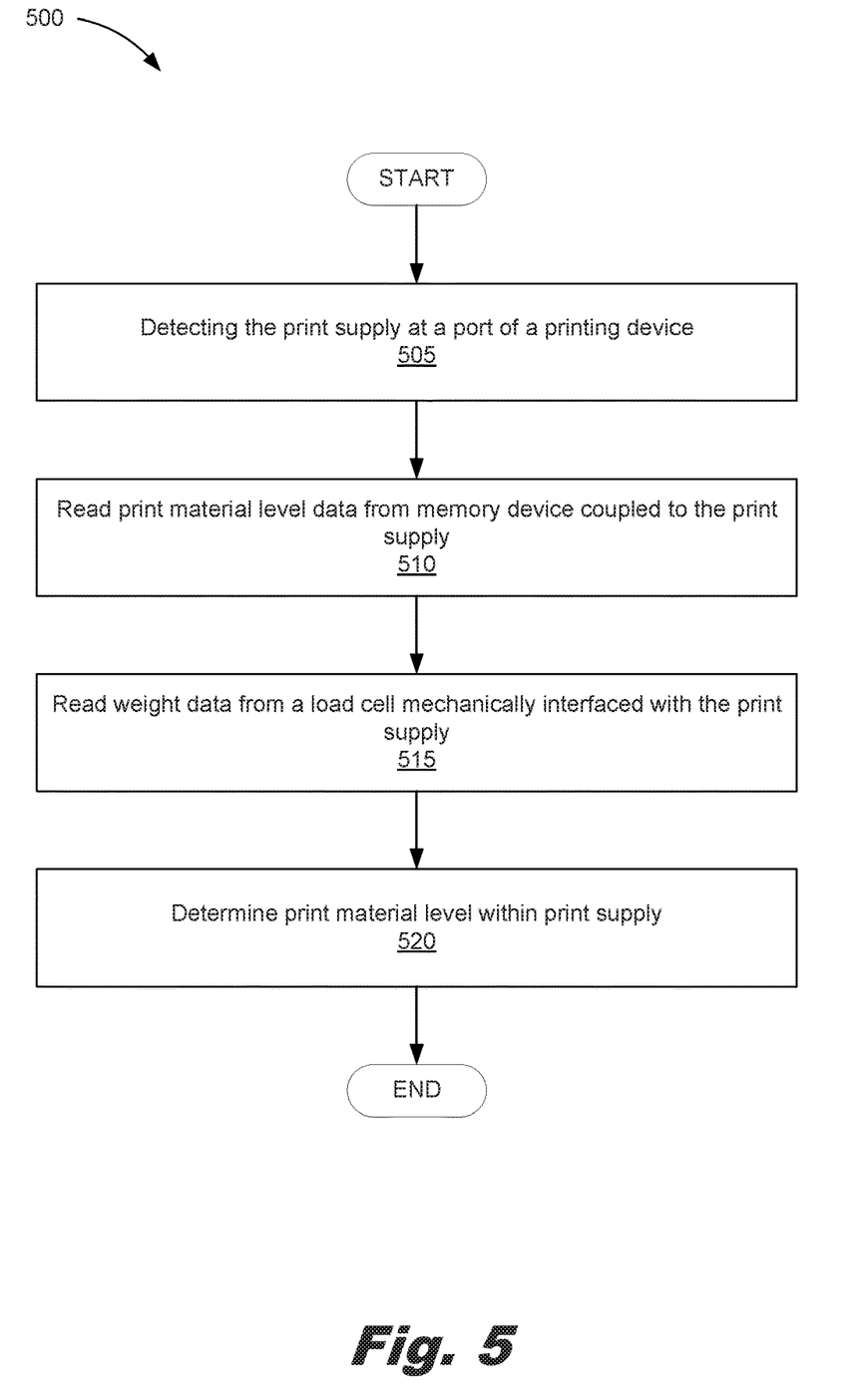
FIG. 5 is a method of determining a level of print material within a print supply according to an example of the principles described herein.

FIG. 5 is a method (500) of determining a level of print material within a print supply according to an example of the principles described herein. In this example method (500) a printing device may detect (505) the print supply interfacing with a port of the printing device. This detection may occur either via an electrical connection to at least a memory device associated with and coupled to the print supply or an electrical signal created via a mechanical device used to couple the print supply to the port of the printing device.

The method (500) may continue with a processor of the printing device reading (510) print material level, volume, and/or weight data from the memory device coupled to the print supply. In this example the interface between the print supply and the printing device may include a number of electrical lines that allow the processor of the printing device to access the memory device. In an example, the memory device of the print supply may be communicatively coupled to a microprocessor such that the microprocessor selectively prohibits and allows access, by the processor of the printing device, access to the memory device. This microprocessor may include security protocols that prevent unauthorized computing devices such as unauthorized printing devices from accessing the memory device.

The method (500) may continue with the processor of the printing device reading (515) weight data from a load cell that is mechanically interfaced with the print supply. In an example, the load cell may be coupled physically and electrically with the processor of the printing device so that pressure placed on the load cell by the print supply may be detected. A weight value registered by the load cell may then be retrieved by the processor of the printing device for analysis. In an example, the load cell may be physically couple to the print supply such that, upon interfacing with the port of the printing device, the weight of the print supply may be provided to the printing device via the electrical pads described herein.

The method (500) may further include determining (520) the level, volume, and/or weight of print material within the print supply. As described above, by reading (515) the weight data from the load cell, the processor of the printing device may determine a current amount of print material remaining in the print supply as well as determine the amount of print material transferred to the printing device. The processor of the printing device may then add the amount of print material transferred to its current estimate of print material in the printing device prior to the transfer to determine the amount of print material within the printing device and available for use. In this example, the processor of the printing device estimates the amount of print material within the print supply before, during, and after the transfer in order to update the level data maintained on the memory device.

Figure 6:
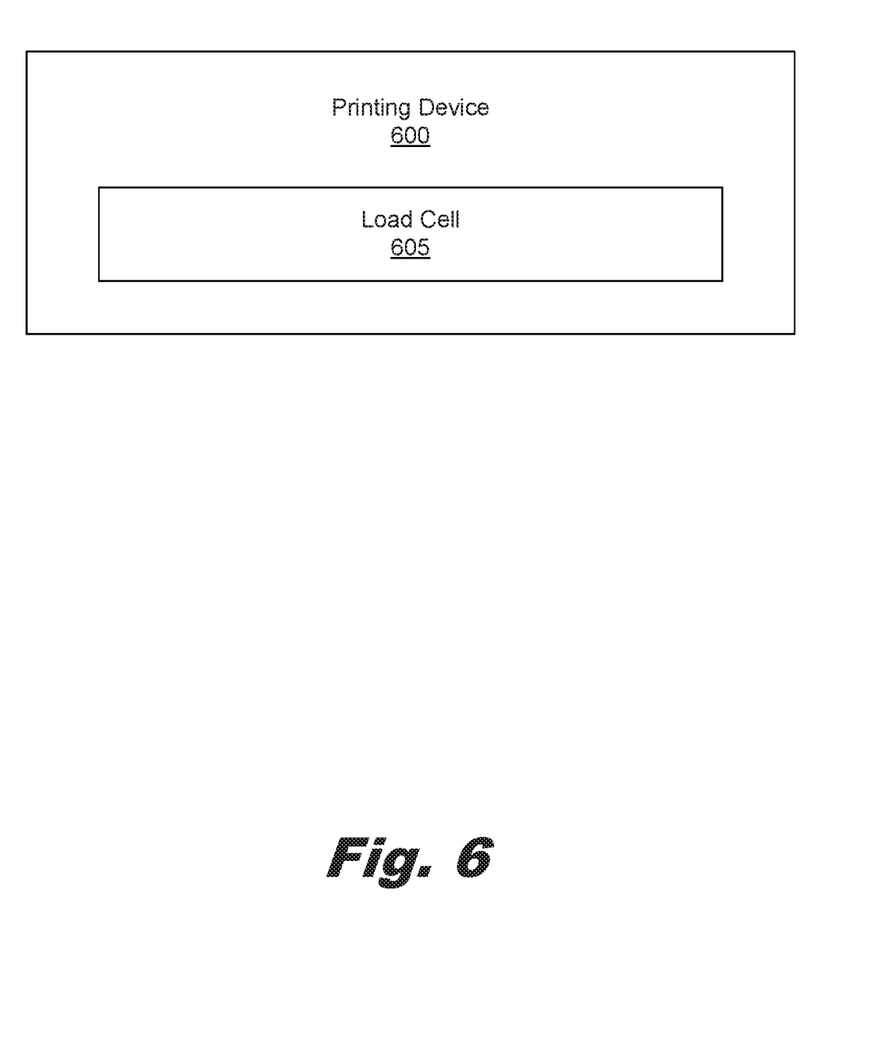
FIG. 6 is a block diagram of a printing device according to an example of the principles described herein.

FIG. 6 is a block diagram of a printing device (600) according to an example of the principles described herein. The printing device (600) may include a load cell (605) as described herein. In an example, printing device (600) may have the load cell (605) placed at a location within the printing device (600) where a mechanical, fluidic, and/or electrical interface used to couple a print supply to the printing device (100) exists. In this example, the load cell (605) may mechanically interface with the print supply as well as electrically interface with a processor of the printing device (600). In an example, the placement of the load cell (605) may be determined based on where the load cell (605) may mechanically interface with the print supply regardless of whether the print supply is fluidically coupled to or electrically coupled to the printing device (600). Thus, the present specification contemplates the placement of the load cell (605) at any location within the printing device (600) so much as to allow the load cell (605) to measure the weight of the print supply.

The measurement of the weight of the print supply by the load cell (605) may be accomplished regardless of whether the print supply is consistently or temporarily coupled to the printing device (600). Indeed, in any example presented herein, the load cell (605) may measure the weight of the print supply before, during, and/or after the transfer of a print material within the print supply to the printing device (600).

In any example presented herein, the value of the weight measured by the load cell (605), at any time, may be provided to a processor of the printing device (600). The processor may execute computer readable program code that defines a process that estimates the weight of the print material contained, at any time, within the print supply. This computer readable program code may convert the output from the load cell (605) into this estimate before, after, and/or during print material transfer process as described herein.

Figure 7:
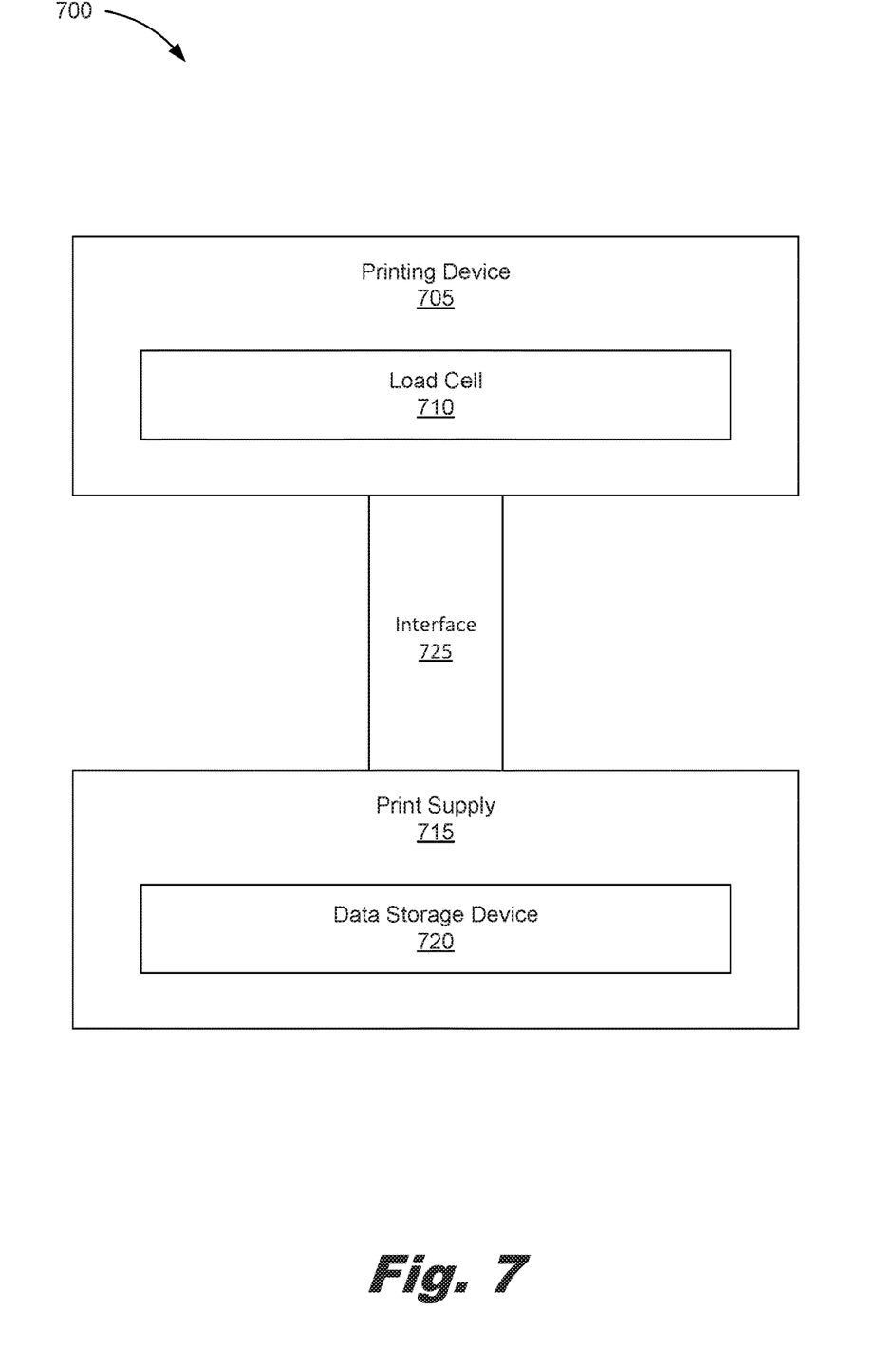
FIG. 7 is a block diagram of a printing system according to an example of the principles described herein.

FIG. 7 is a block diagram of a printing system (700) according to an example of the principles described herein. The printing system (700) may include, in an example, a printing device (705) selectively coupled to a print supply (715) via an interface (725). As described herein, the interface (725) may be a mechanical interface, a fluidic interface, and/or an electrical interface based on the functionality of the printing system (700) at any given point in time.

The printing device (705) may include a load cell (710) as described herein. In this example, the load cell (710) may be placed at a location within the printing device (705) where the mechanical, fluidic, and/or electrical interface (725) used to couple the print supply (715) to the printing device (705) is located. In this example, the load cell (710) may mechanically interface with the print supply (715) as well as electrically interface with a processor of the printing device (705). In an example, the placement of the load cell (710) may be determined based on where the load cell (710) may mechanically interface with the print supply (715) regardless of whether the print supply (715) is fluidically coupled to or electrically coupled to the printing device (705). Thus, the present specification contemplates the placement of the load cell (710) at any location within the printing device (705) so as to allow the load cell (710) to measure the weight of the print supply (715).

The measurement of the weight of the print supply (715) by the load cell (710) may be accomplished regardless of whether the print supply (715) is consistently or temporarily coupled to the printing device (705). Indeed, in any example presented herein, the load cell (710) may measure the weight of the print supply (715) before, during, and/or after the transfer of a print material within the print supply (715) to the printing device (705).

In the example presented in FIG. 7, the print supply (715) may include a data storage device (720). In an example, the data storage device (720) may be any type of non-volatile memory device. Example non-volatile memory devices may include read-only memory (ROM), programmable read-only memory (PROM), erasable programmable read-only memory (EPROM), electrical erasable read-only memory (EEPROM), flash memory, non-volatile random-access memory (NVRAM), and resistive random-access memory (ReRAM), among others.

In any example presented herein, the data storage device (720) may be electrically coupled to the printing device (705) when the print supply (715) is mechanically and/or fluidically coupled to the printing device (705). The non-volatile memory device contains data which can be read and updated by the printing device. The data storage device (720) stores a record that may be interpreted by the processor of the printing device (705) so as to determine the initial provisioning of print material in the print supply (715) as well as the amount of print material that has subsequently been removed from the print supply (715) during a print material transfer process. At any time, this record may be updated with a current amount of print material removed and/or remaining within the print supply (715).

Figure 8:
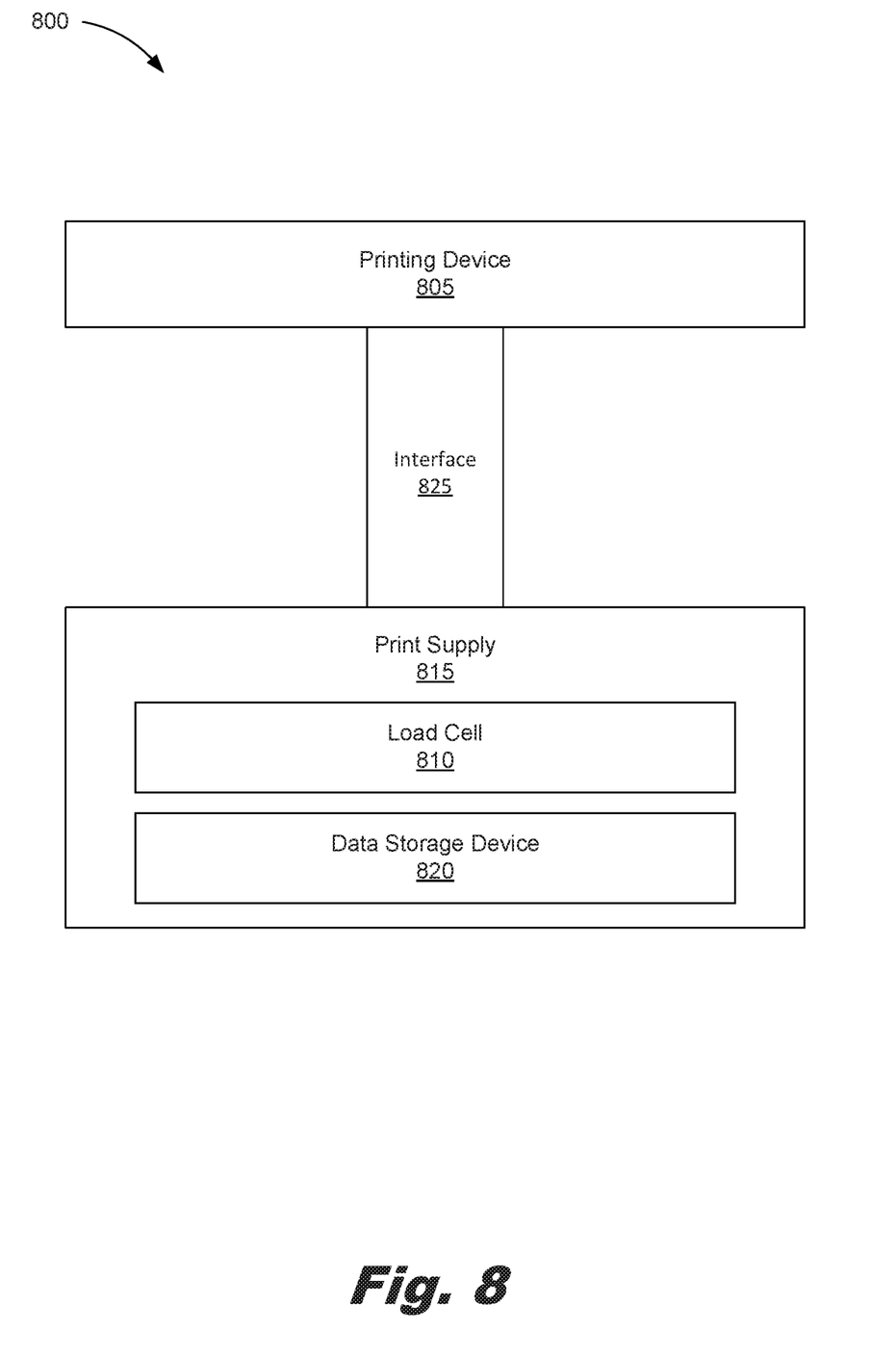
FIG. 8 is a block diagram of a printing system according to an example of the principles described herein.

FIG. 8 is a block diagram of a printing system (800) according to an example of the principles described herein. The printing system (800) may be similar to the printing system (FIG. 7, 700) as shown and described in connection with FIG. 7 except for the placement of the load cell (810). Indeed, in the example show in FIG. 8, the printing device (805) and the print supply (815) may include an interface (825) that fluidically, mechanically, and/or electrically interfaces the print supply (815) to the printing device (805).

As shown in FIG. 8, the print supply (815) includes both a load cell (810) and a data storage device (820). The features of the data storage device (820) and load cell (810) may be similar to that described in connection with FIG. 7. The load cell (810) and data storage device (820) may be positioned such that when the print supply (815) is mechanically and/or fluidically coupled to the printing device (805), the load cell (810) and data storage device (820) are electrically coupled to the printing device (805). In an example, the load cell (810) and data storage device (820) may be electrically and/or communicatively coupled to each other so as to reduce the number of electrical contacts formed between them and printing device (805), By limiting or reducing the number of electrical contacts formed, the manufacturing costs associated with the manufacturing of the printing device (805) and/or print supply (815) may be reduced. While coupled, the printing device (805) may selectively read output from the load cell (710) as it mechanically interfaces with the printing device (805) and read/write data from and to the data stored on the storage device (820).

In an example, the print supply (815) of the printing system (800) described in connection with FIG. 8 may include an integrated circuit. The integrated circuit may include the data storage device (820) as described. Additionally, the integrated circuit may allow a processor of the printing device (805) to communicate or otherwise access the data storage device (820). Thus, the printing device (805) may selectively communicate with the load cell (810) and/or integrated circuit or the processor of the printing device (805) may communicate with the load cell (810) via the integrated circuit. In any example presented herein, the integrated circuit may have the capability to process information from and to a processor of the printing device (805). In an example, the integrated circuit may further have the capability to provide secure access to information stored on the data storage device (820) by a processor of the printing device (805).

In other examples, the integrated circuit may interface with the printing device (805) using a number of contact pads formed on the print supply (815) and a number of, for example, spring-loaded contacts formed on the printing device (805). In this example, the integrated circuit may temporally electrically couple to the printing device (805) to the print supply (815) while the print supply (815) is mechanically and/or fluidically coupled to the printing device (805). In response to a command received from the printing device (805), the integrated circuit may, through switching of one or more GPIO (general purpose input/outputs), provide the printing device (805) with temporary access to the data provided by the load cell (810) and/or data storage device (820). With this type of topology, when multiple replaceable print supplies (815) are installed at multiple interfaces (825) of the printing device (805) concurrently, each load cell (710) may not implement, for example, a unique $I^2C$ serial bus address. Indeed, in this example, all load cells (810) may share the same $I^2C$ serial bus address so long as this differs from that of the integrated circuits.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (420) of the printing device (300, 400) and/or integrated circuit (480) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an interface between a print supply and a printing device that includes a load cell. The load cell may measure the weight of the supply before, during, and/or after print material has been transferred from the print supply to the printing device. The printing device may access an integrated circuit of the print supply in order to determine whether to begin a transfer of print supply to the printing device. This may prevent damage to the printing device should no print material be presented within the print supply. In an example, the printing device may determine the volume of print material transferred by tracking pump time, speed, and volume and by measuring the continuous ink level gauge on the internal reservoir. Additionally, the printing device may vary the rate at which it transfers print material and the timing of when it initiates the transfer and hold off on updating the integrated circuit device with the estimated print material remaining, Consequently, a print supply includes a load cell that is used to deduce the quantity of print material remaining and convert this to an accurate estimate reported to the printing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A print supply, the print supply containing a print material and to connect to a printing device to provide the print material to the printing device, comprising:
   a container to maintain the print material;
   an integrated circuit coupled to the box to interface electrically with the printing device;
   a load cell communicatively coupled to the integrated circuit to detect a weight of the print liquid supply, wherein a volume of print liquid supply determined from the weight of the print liquid supply is compared against a volume of print material within an internal reservoir if the printing device to validate a reported print material transfer to the internal reservoir.

2. The print supply of claim 1, comprising a memory device to receive data describing the weight of the print supply.

3. The print supply of claim 2, wherein the memory device receives and stores data describing a transfer of print material to the printing device.

4. The print supply of claim 2, wherein the memory device comprises calibration data to calibrate a weight of print material within the print supply.

5. The print supply of claim 4, wherein the calibration data includes an error associated with the load cell.

6. The print supply of claim 4, comprising a processor to:
   cross-reference a value of the weight of the print material within the print supply with a look-up table to determine a volumetric value; and
   compare the volumetric value to an initial volumetric value stored on the memory device.

7. A method of determining a volume of print material within a supply, comprising:
   detecting the supply at a port of a printing device;
   with a processor, reading a volumetric value of print material within the supply saved on an integrated circuit coupled to the supply;
   conducting a print material transfer process comprising drawing print material from the supply to an internal reservoir in the printing device;
   measuring a level of print material within the internal reservoir during the transfer process;
   reporting a detected change in a load cell value at an interface between the port and printing device; and
   validating a reported print material transfer to the internal reservoir by comparing a volume value associated with the detected change with a change in volume of print material within the internal reservoir to get a volume comparison value.

8. The method of claim 7, comprising, when the load cell value is less than the volume comparison value, presenting a warning indicating a leak in the supply.

9. The method of claim 7, comprising, when the load cell value is greater than the volume comparison value or recorded weight, presenting a warning indicating the supply is defective.

10. The method of claim 7, comprising, when the load cell value is equal to the volume comparison value, updating the volumetric value of print material within the supply saved on an integrated circuit.

11. The method of claim 7, further comprising estimating an updated amount of print material within the internal reservoir by adding an amount of the print material transfer as detected by the load cell to an estimate of print material in the internal reservoir.

12. A printing device, comprising:
    a print material port;
    a load cell located at the print material port to detect a weight of a supply;
    an internal reservoir; and
    a processor to:
       detect an amount of print material transferred to the internal reservoir; and
       compare the amount of print material transferred to the internal reservoir to the detected weight of the supply.

13. The printing device of claim 12, wherein the amount of print material transferred to the internal reservoir is detected using a continuous print material level gauge.

14. The printing device of claim 12, wherein the processor determines, based on an initial print material level within the supply, whether to write, or record, or cause to be recorded an updated print material quantity value to an integrated circuit of the supply.

15. The printing device of claim 12, further comprising a look up table wherein the processor cross-references the detected weight of the supply with a quantity value of print material in the supply.

16. A print system, comprising:
    a printing device;
    a print supply to be hung from a print material ace of the printing device; and
    a load cell located at a print material port to detect a weight of the print supply; and
    a processor to:
       based on a detected weight of the print supply by the load cell, determine a quantity of print material within the print supply; and
       validate a reported print material transfer to an internal reservoir of the printing device by comparing a volume value associated with a change with the detected weight of the print supply with a change in volume of print material within the internal reservoir.

17. The print system of claim 16, wherein determining the quantity of print material within the print supply is done before, during, and/or after a print material transfer process from the print supply to the printing device.

18. The print system of claim 16, wherein the print material interface includes a vertical channel to receive print material from the print supply to the printing device.

19. The print system of claim 16, wherein an amount of print material transferred to the printing device is detected using a continuous print material level gauge.

20. The print system of claim 16, wherein the processor determines, based on an initial print material level within the print supply, whether to write, or record, or cause to be recorded an updated print material quantity value to an integrated circuit of the supply.

21. The printing device of claim 16, further comprising a look up table wherein the processor cross-references the detected weight of the supply with a quantity value of print material in the supply.

22. The printing device of claim 16, wherein the print supply comprises an integrated circuit to receive a value descriptive of the determined quantity of print material within the print supply.

23. The printing device of claim 22, wherein the integrated circuit maintains authentication data to authenticate the print supply with the printing device.

24. The printing device of claim 23, wherein the authentication data prevents tampering of data maintained on the integrated circuit.

* * * * *